United States Patent [19]
Shibata

[11] 3,789,281
[45] Jan. 29, 1974

[54] ELECTRIC CONTROL SYSTEM OF AN ELECTRIC MACHINE ARRANGEMENT COMBINING ELECTROMAGNETIC COUPLING WITH AN ELECTRIC ROTATING MACHINE

[75] Inventor: Fukuo Shibata, Hyogo, Japan

[73] Assignee: Kawasaki Jukogyo Kabushiki Kaisha, Hyogo, Japan

[22] Filed: May 30, 1972

[21] Appl. No.: 257,620

[30] Foreign Application Priority Data
May 28, 1971 Japan.............................. 46-36746
Sept. 26, 1971 Japan.............................. 46-74932

[52] U.S. Cl..................... 318/696, 290/12, 290/39, 290/49, 318/197
[51] Int. Cl. ........................................... H02k 17/24
[58] Field of Search....... 290/12, 15, 20, 23, 39, 49; 318/139, 197

[56] References Cited
UNITED STATES PATENTS

| | | | |
|---|---|---|---|
| 3,488,567 | 1/1970 | Shibata | 318/197 |
| 3,441,822 | 4/1969 | Shibata | 318/197 |
| 3,514,681 | 5/1970 | Dorn et al. | 318/197 |
| 1,321,617 | 11/1919 | Fynn | 290/15 |
| 1,361,244 | 12/1920 | Fynn | 290/15 |
| 1,280,833 | 10/1918 | Potter | 290/12 |
| 1,280,832 | 10/1918 | Potter | 290/12 |
| 1,616,658 | 2/1927 | Heany | 290/12 |
| 1,293,646 | 2/1919 | Kurtz | 290/12 |

Primary Examiner—G. R. Simmons
Attorney, Agent, or Firm—Sughrue, Rothwell, Mion, Zinn & Macpeak

[57] ABSTRACT

An electromagnetic coupling having two rotors is connected mechanically with an electric rotating machine, an armature winding of the electromagnetic coupling is connected electrically with an armature winding of the electric rotating machine through a converter, and an electric battery group is connected electrically in series with the armature winding of the electric rotating machine and D.C. terminals of the converter. The load of the above electric machine arrangement can be supplied with power properly from the electric battery group and a driving machine such as a prime mover which drives the above electric machine arrangement.

18 Claims, 9 Drawing Figures

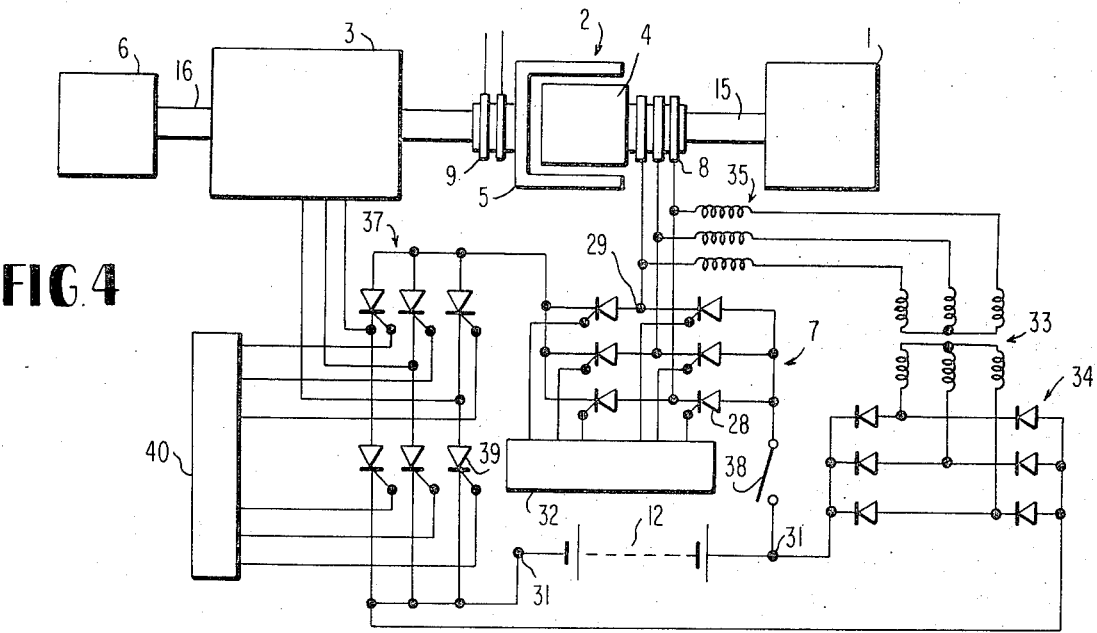
FIG. 4
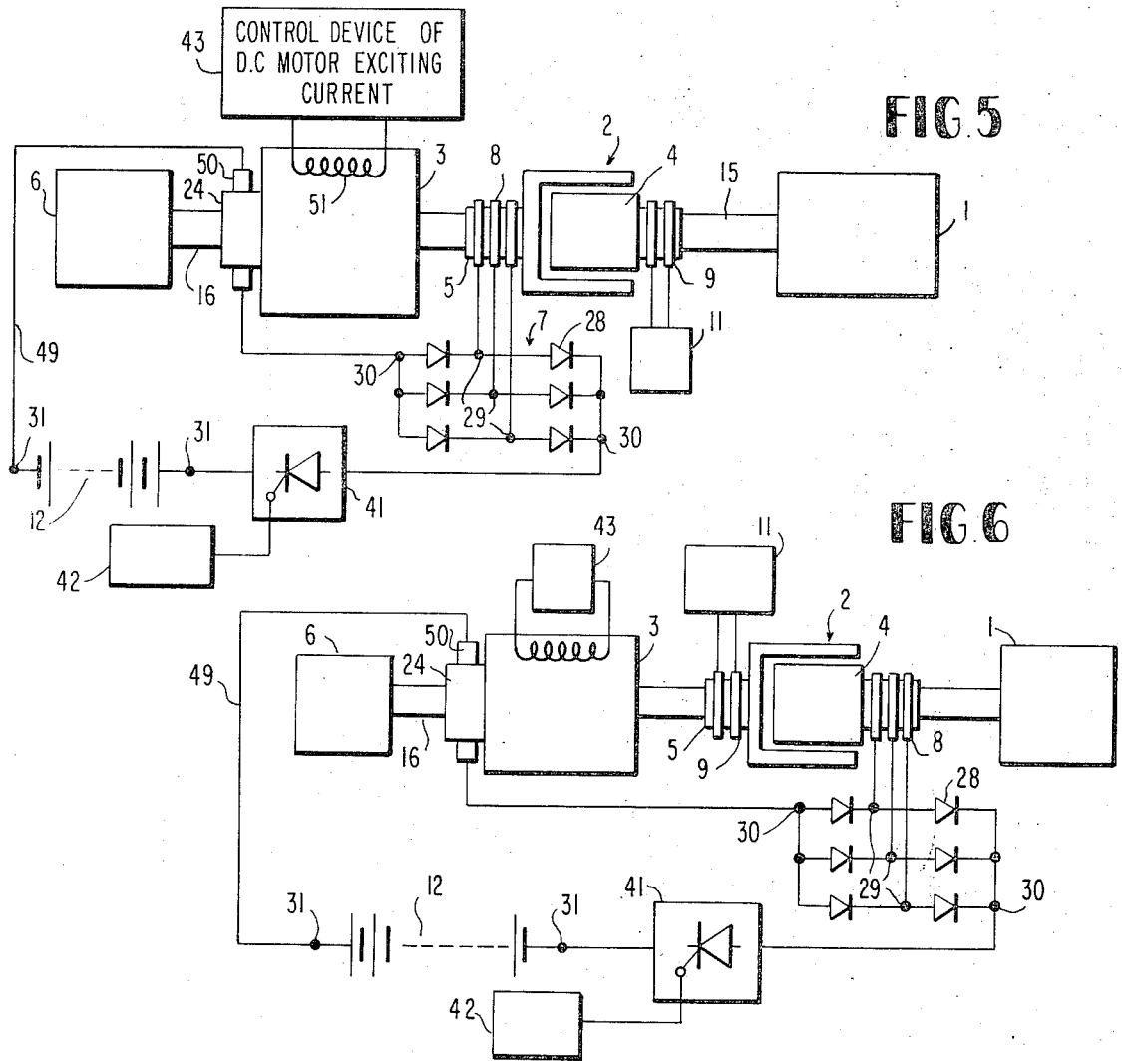
FIG. 5
FIG. 6

ELECTRIC CONTROL SYSTEM OF AN ELECTRIC MACHINE ARRANGEMENT COMBINING ELECTROMAGNETIC COUPLING WITH AN ELECTRIC ROTATING MACHINE

BACKGROUND OF THE INVENTION

1. Field of the Invention

This invention is in the field of an electrical control system of an electric machine arrangement combining an electromagnetic coupling with an electric rotating machine. The electric machine arrangement can be operated as a power transmitting device through which an output of a driving machine is transmitted to a load. The driving machine is a machine which gives a mechanical rotary output to the load through an output shaft; for example, an electric motor, a prime mover such as a diesel, a gas turbine, a steam turbine, a water wheel, a vapour engine, a gasoline engine etc. One of the most important fields of application of the invention is in an electric control system for driving an electric vehicle whose wheel can be driven by an electric power supplied from an electric battery group.

2. Description of the Prior Art

In general, an electric motor for driving a wheel of an electric vehicle is supplied with electric power from only an electric battery group. In a prior method of electric control for driving an electric vehicle, a direct current motor supplied with electric power from only an electric battery group is controlled by a thyrister chopper which is connected electrically between the motor and the electric battery group. Such an electric control system becomes complicated and considerably expensive system.

In another prior method of electric control for driving an electric vehicle, an alternating current motor supplied with electric power from only an electric battery group is controlled by a thyrister inverter which is connected electrically between the motor and the electric battery group.

In such a case, the inverter using semiconductor controlled rectifiers becomes very complicated, unreliable in operation and expensive as there are various difficult problems in connection with commutations.

In another case, an electric motor for driving a wheel of an electric vehicle is supplied with electric power from both an electric battery group and a generator driven by a prime mover. In such a case, the electric control system becomes complicated and considerably expensive.

SUMMARY OF THE INVENTION

It is the primary object of the invention to provide an electric control system for driving a load such as a wheel of an electric vehicle which can be supplied with a driving power from both an electric battery group and a prime mover with simplicity.

Another object of the invention is to provide an electric control system for driving a load such as a wheel of an electric vehicle which has a prime mover and an electric battery group as a power source and of which the speed can be controlled over a wide speed range without sacrificing efficiency of operation or economy of apparatus of this system.

A further object of this invention is to make it possible to reduce considerably installation space of an electric control system for driving a load such as a wheel of an electric vehicle.

A still further object of this invention is to make it possible to reduce considerably the weight of an electric battery group necessary to install in a plant such as an electric vehicle.

Other object of the invention will in part be obvious and in part appear hereinafter.

Accordingly, this invention is disclosed in the embodiments thereof shown in the accompanying drawings and comprises the features of contructions, combination of elements and arrangement of parts which will be indicated in the appended claims.

BRIEF DESCRIPTION OF THE DRAWINGS

FIG. 3, FIG. 4, FIG. 5, FIG. 6 and FIG. 9 illustrate diagrammatically systems of this invention.

DESCRIPTION OF THE PREFERRED EMBODIMENTS

Figure 1:
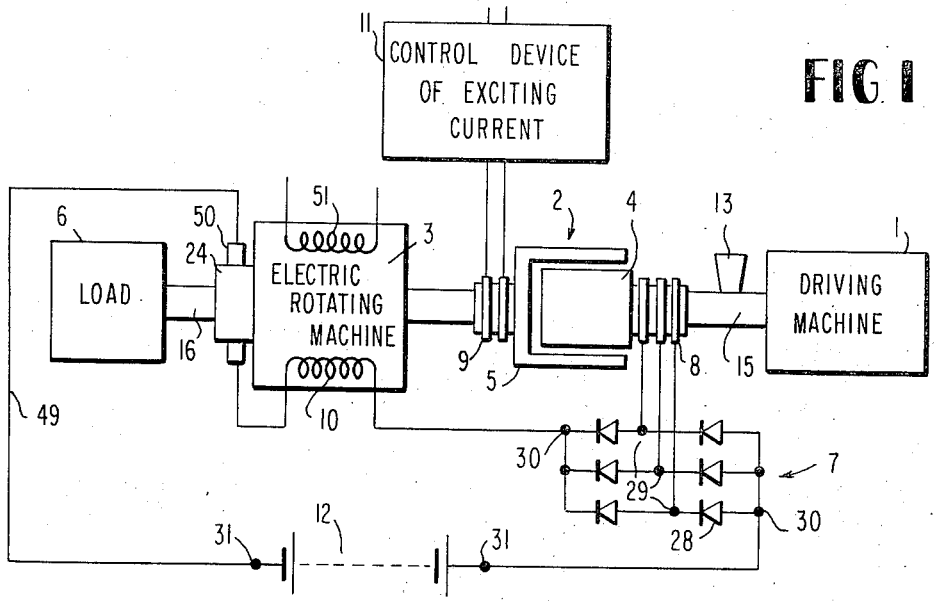
FIG. 1, FIG, 2.
Figure 7:
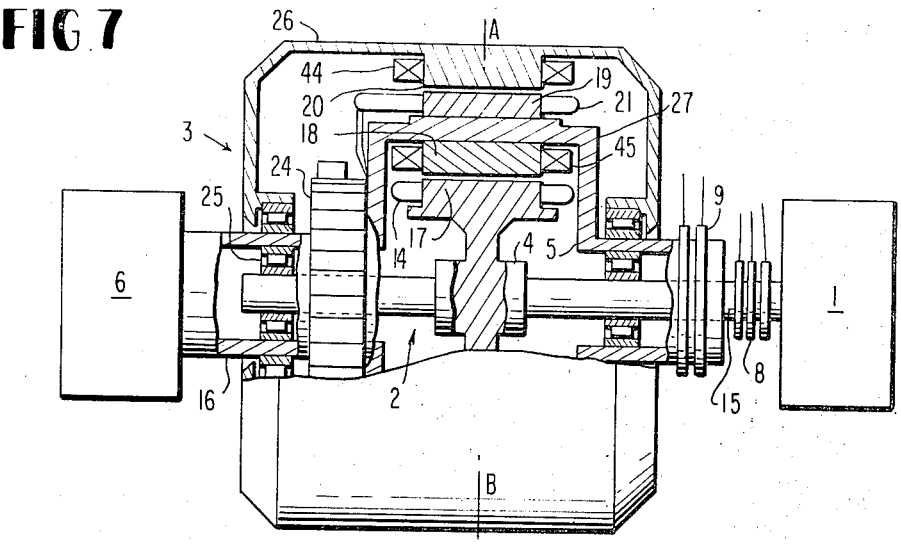
FIG. 7 and FIG. 8 illustrate embodiments of construction of an arrangement of this invention.
Figure 8:
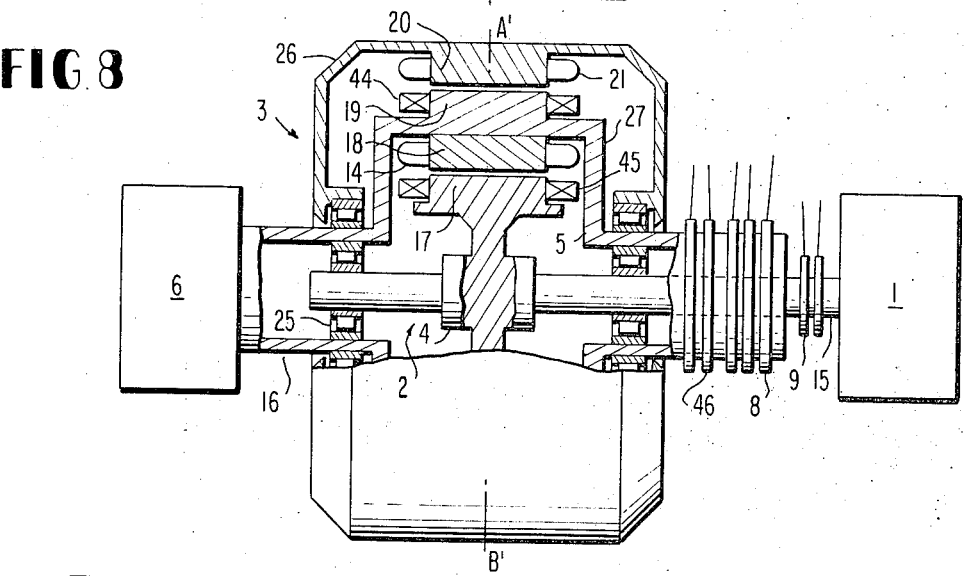

As shown in FIG. 1, FIG. 7 and FIG. 8, the electric control system of an electric machine arrangement of this invention comprises the combination of: an electromagnetic coupling 2 having two rotors 4, 5 which rotate with respect to each other, one of which is provided with an armature winding 14; an electric rotating machine 3 having a stator 26, a rotor 27 and an armature winding 21; mechanical combination of one of the said two rotors 4,5 of the said electromagnetic coupling 2 with the said rotor 27 of the said electric rotating machine 3; a converter 7 which is composed of rectifiers 28 and has A.C. terminals 29 and D.C. terminals 30; electric connection between the said armature winding 14 of the said electromagnetic coupling 2 and the said armature winding 21 of the electric rotating machine 3 through said converter 7; and an electric battery group 12 which has output terminals 31 being arranged to connect the battery group electrically in series with the said armature winding 21 of the electric rotating machine 3 and the said D.C. terminals 30 of the converter 7, so that the electric battery group 12 can supply the said electric rotating machine 3 with an electric power through the said rectifiers 28 of the converter 7; simultaneously with supply of electric power to the said electric rotating machine 3 from the electromagnetic coupling 2 wherein the said rotor 5 of the electromagnetic coupling 2 combined mechanically with the rotor 27 of the electric rotating machine 3 drives a load 6, and the other rotor 4 of the electromagnetic coupling 2 is driven by a driving machine 1.

In FIG. 1, the armature winding of the direct current commutating machine 3, which is an example of the electric rotating machine, is electrically connected with the armature winding of the electromagnetic coupling 2 through rectifiers 28, commutators 24 and brushes 50 of the direct current commutating machine 3, sliprings 8 of the electromagnetic coupling 2 and the electric battery group 12. The symbol 49 shows an electric wiring. Symbols 15 and 16 show respectively the input shaft and output shaft of the electric machine arrangement of the electromagnetic coupling 2 combined with the electric rotating machine 3. The rotor 5 of the electromagnetic coupling 2 in FIG. 1, FIG. 7 and FIG. 8 is respectively provided with a direct current winding 45 supplied with exciting current from the electric source (not shown in the drawing) through sliprings 9 and a control device 11 of exciting current of electromagnetic coupling 2. The direct current commutating machine 3 provided with a series field winding 10 is supplied with electric power from the electric battery group 12 and the electromagnetic coupling 2 through the converter 7 in FIG. 1. On the contrary, the polarity of the electric battery group 12 in FIG. 2 electrically connected in series with the D.C. terminals 30 of the converter 7 and the armature winding of the electric rotating machine 3 is so arranged that the electric battery group 12 can be supplied with electric power from the electromagnetic coupling 2 through the converter 7 and the direct current commutating machine 3, while the load 6 is driven by the electric machine arrangement of the direct current commutating machine 3 combined with the electromagnetic coupling 2. The speed of the load 6 can be controlled by controlling the exciting current of the electromagnetic coupling 2 with the control device 11 of the exciting current. When a stopper 13 is so operated that the input shaft 15 of the electromagnetic coupling 2 can be fixed in a stationary condition, the direct current commutating machine 3 is supplied with electric power from only the electric battery group 12 in FIG. 1. In this case, the electromagnetic coupling 2 can be operated as an electric A.C. generator.

Figure 2:
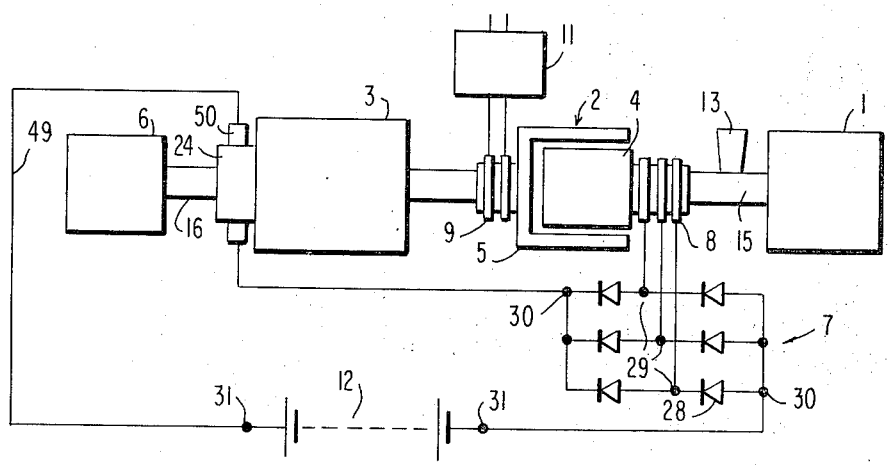

As is found from FIG. 7, the electric rotating machine 3 in FIG. 1, FIG. 2 and FIG. 7 is a direct current commutating machine having a stator 26 provided with poles 20 and a rotor 3 provided with an armature winding 21 and commutators 24. The rotor 27 of the direct current commutating machine 3 and the rotor 5 of the electromagnetic coupling 2 are in one body, in FIG. 7 which shows an example of construction of an arrangement of this invention. The stator 26 of the direct current commutating machine 3 is provided with field windings 44 as shown in FIG. 7. The field windings 44 consists of a voltage winding 51 and a current winding 10 in FIG. 1.

Symbols 25 and 50 show respectively bearings and brushes. In FIG. 7, a rotor 5–27 is used in common as one of the two rotors of the electromagnetic coupling 2 and as the rotor of the direct current commutating machine 3 by an arrangement in which the inner face of the rotor 5 is provided with material 18 of a magnetic circuit for the electromagnetic coupling 2 and the outer face of the rotor 27 is provided with material 19 of a magnetic circuit for the direct current commutating machine 3, and the said rotor 5 of the electromagnetic coupling 2 rotates in a space between the stator 26 of the direct current commutating machine 3 and the other rotor 4 of the electromagnetic coupling 2 rotates in a space between the stator 26 of the direct current commutating machine 3 and the other rotor 4 of the electromagnetic coupling 2. FIG. 7 shows that the surface of the material 17 of the magnetic circuit of the rotor 4 of the electromagnetic coupling 2 and the surface of the material 20 of the field pole of the direct current commutating machine 3 exist together in a section AB perpendicular to a shaft of the rotor 4 of the electromagnetic coupling 2.

The rotor 5 of the electromagnetic coupling 2 in FIG. 1 is provided with a direct winding 45 of FIG. 7 supplied with exciting current, and the other rotor 4 of the electromagnetic coupling 2 in FIG. 1 is provided with an armature winding 14 of FIG. 7, as explained before.

When the said direct current winding 45 of the rotor 5 is supplied with exciting current, a magnetic field can be produced in the rotor 5. When the rotor 4 is drive by the driving machine 1, an electromagnetic force can be induced in the said armature winding 14 of the rotor 4 by the relative motion of the said magnetic force rotating with the rotor 5 across the armature winding 14 of the rotor 4. The larger the values of the relative speed between the rotors 4 and 5 and of the exciting current of the direct current winding 45 are, the larger the value of the said electromagnetic force induced in the armature winding of the rotor 4 is.

When the electromotive force is induced in the armature winding of the rotor 4 driven by the driving machine 1, a current flows in the armature winding of the rotor 4 through the rectifiers 28 of the converter 7, the electric battery group 12 and the armature winding of the direct current commutating machine 3, in FIG. 1. An electromagnetic force acting between the magnetic field and a current in the armature winding by the electromotive force can be transmitted from the electromagnetic coupling 2 to the load 6, while the electromagnetic coupling 2 can supply the direct current commutating machine 3 with an electric power which is decided by the current and the above electromotive force induced in the coupling by the relative speed between the rotors 4 and 5. In FIG. 1, the direct current commutating machine 3 can drive the load 6 with mechanical power converted from the input electrical power which flows into the current commutating machine 3 in part from the armature winding of the electromagnetic coupling 2 and in part from the electric battery group 12 through the rectifiers 28 of the converter 7. In this case, the converter 7 composed of rectifiers 28 not only operates as a converter which converts alternating current power of the armature winding of the electromagnetic coupling 2 into direct current power, but also makes direct current power pass from the electric battery group 12 to the direct current commutating machine 3. For example, supposing that the rotor 4 of the electromagnetic coupling 2 is driven by the driving machine 1 at speed of 1,000 rpm., the exciting current of the direct current winding of the rotor 5 is controlled at 5 ampere by the control device 11, and the A.C. voltage induced in the armature winding of the rotor 4 is 100 V, the A.C. voltage is converted into 135 V D.C. which comes out on the D.C. terminals 30 of the converter 7 in FIG. 1. If the terminal voltage of the electric battery group 12 is 100 V., the terminal voltage supplied to the direct current commutating machine 3 becomes the D.C. terminal voltage (135 V) of the converter 7 plus the terminal voltage (100V) of the electric battery group 12, therefore is equal to 135 V + 100 V + 235 V. If the current of the direct current commutating machine is 100 A, the direct current commutating machine 3 receives input power 235 V × 100 A = 23.5KW partly from the electric battery group 12 (100 V × 100 A = 10 KW) and partly from the armature winding of the electromagnetic coupling 2 through the converter 7 (135 V × 100 A = 13.5 KW), according to calculation in which various small losses are neglected. In this case, if the speed of the direct current commutating machine 3 or of the rotor 5 of the electromagnetic coupling 2 is 400 rpm, the mechanical output of the electromagnetic coupling 2 which is transmitted from the rotor 4 to the load 6 through the rotor 5 becomes approximately 13.5 KW × 400/(1,000−400) =

9 KW, because the ratio of the mechanical output of the electromagnetic coupling to the electrical output is equal to the ratio of the speed of the rotor 5 to the relative speed between the two rotors 4 and 5. Thus, the load 6 is driven by the sum (32.5 KW) of the output power (23.5 KW) of the direct current commutating machine 3 and the mechanical power (9 KW) transmitted from the rotor 4 to the rotor 5 of the electromagnetic coupling 2. In this case, the exciting current of the direct current winding of the electromagnetic coupling 2 is controlled from 5 A to 3 A by the control device 11, the A.C. voltage induced in the armature winding of the rotor 4 is controlled from 100 V to X volt. If it is controlled from 100 V to X volt, the terminal voltage supplied to the direct current commutating machine 3 is controlled from 235 V to X × 1.35 + 100.

In this case, if the exciting current of the voltage field winding 51 in the direct current commutating machine 3 is kept constant, the speed s of the direct current commutating machine 3 becomes approximately $$X \times 1.35 + 100/s = 235/400$$

therefore, $$s = 400/235 \times (1.35X + 100) \quad (1)$$

because the speed of the direct current commutating machine 3 is in proportion to the voltage supplied to the terminals. On one hand, the speed of the electromagnetic coupling 2 can be controlled so that the terminal voltage of the electromagnetic coupling 2 may balance with counter electromotive force on the terminal 8 of the armature winding of the electromagnetic coupling 2. Therefore, we can get an equation $$5 A (1,000 - 400)/3 A (1,000 - s) = 100/X \quad (2)$$

where 5 A/3 A shows the exciting current of the direct current winding of the electromagnetic coupling 2. From equations (1) and (2), $$s = 325 \text{ rpm}.$$

Thus, it could have been understood that the speed of the load can be controlled from 400 rpm to 325 rpm by controlling the exciting current of the direct current winding of the electromagnetic coupling 2 from 5 A to 3 A with the control device 11, in FIG. 1.

In FIG. 2, the system can be controlled while the electric battery group 12 is being charged, although the system of FIG. 1 is controlled while the electric battery group 12 is being discharged. For example, supposing that the rotor 4 of the electromagnetic coupling 2 is driven by the driving machine 1 at speed of 100 rpm, the exciting current of the direct current winding of the rotor 5 is controlled at 5 ampere by the control device 11, and the A.C. voltage induced in the armature winding of the rotor 4 is 100 V, the A.C. voltage is converted into 135 V D.C. which comes out on the D.C. terminals 30 of the converter 7 in FIG. 2. If the terminal voltage of the electric battery group 12 is 50 V, the terminal voltage supplied to the direct current commutating machine 3 becomes the D.C. terminal voltage (135 V) of the converter 7 minus the terminal voltage (50 V) of the electric battery group 12, therefore is equal to 135 V −5 V = 85 V. If the current of the direct current commutating machine is 100 A, the direct current commutating machine 3 receives input power 85 V × 100 A = 8.5 KW from the armature winding of the electromagnetic coupling 2 through the converter 7, while the electric battery group 12 is being charged by 50 V × 100 A = 5 KW from the armature winding of the electromagnetic coupling 2, according to calculation in which various small losses are neglected. In this case, if the speed of the direct current commutating machine 3 or of the rotor 5 of the electromagnetic coupling 2 is 400 rpm, the mechanical output of the electromagnetic coupling 2 which is transmitted from the rotor 4 to the load 6 through the rotor 5 becomes approximately 13.5 KW × 400/1,000−400 = 9 KW, because the ratio of the mechanical output of the electromagnetic coupling to the electrical output is equal to the ratio of the speed of the rotor 5 to the relative speed between the two rotors 4 and 5.

Thus, the load 6 is driven by sum of the output power 8.5 KW of the direct current commutating machine 3 and the mechanical power 9 KW transmitted from the rotor 4 to the rotor 5 of the electromagnetic coupling 2. In this case, the exciting current of the direct current winding of the electromagnetic coupling 2 is controlled from 5 A to 3 A by the control device 11, the A.C. voltage induced in the armature winding of the rotor 4 is controlled 100 V to Y volt. If it is controlled from 100 V to Y volt, the terminal voltage supplied to the direct current commutating machine 3 is controlled from 85 V to Y × 1.35 − 100 volt. In this case, if the exciting current of the voltage field winding 51 in the direct current commutating machine 3 is kept constant, the speed s of the direct current commutating machine 3 becomes approximately $$Y \times 1.35 - 100/s = 85/400$$

therefore, $$s = 400/85 \times (1.35 Y - 100) \quad (3)$$

because the speed of the direct current commutating machine 3 is in proportion to the voltage supplied to the terminals. On one hand, the speed of the electromagnetic coupling 2 can be controlled so that the terminal voltage of the electromagnetic coupling 2 may balance with counter electromotive force on the terminal 8 of the armature winding of the electromagnetic coupling 2. Therefore, we can get an equation $$5 A (1,000 - 400)/3 A (1,000 - s) = 100/Y \quad (4)$$

where 5 A/ 3 A shows the exciting current of the direct current winding of the electromagnetic coupling 2. From equations (3) and (4), $$s = 100 \text{ rpm}.$$

Thus, it could have been understood that the speed of the load can be controlled from 400 rpm to 100 rpm by controlling the exciting current of the direct current winding of the electromagnetic coupling 2 from 5 A to 3 A with the control device 11 in FIG. 2.

As can be understood from the above explanation of FIG. 1 and FIG. 2, the speed of the load of this system can be controlled by controlling the control device 11 of exciting current of the electromagnetic coupling while the driving machine 1 is driven at a constant speed, although the converter 7 is composed of diodes rectifiers.

Figure 3:
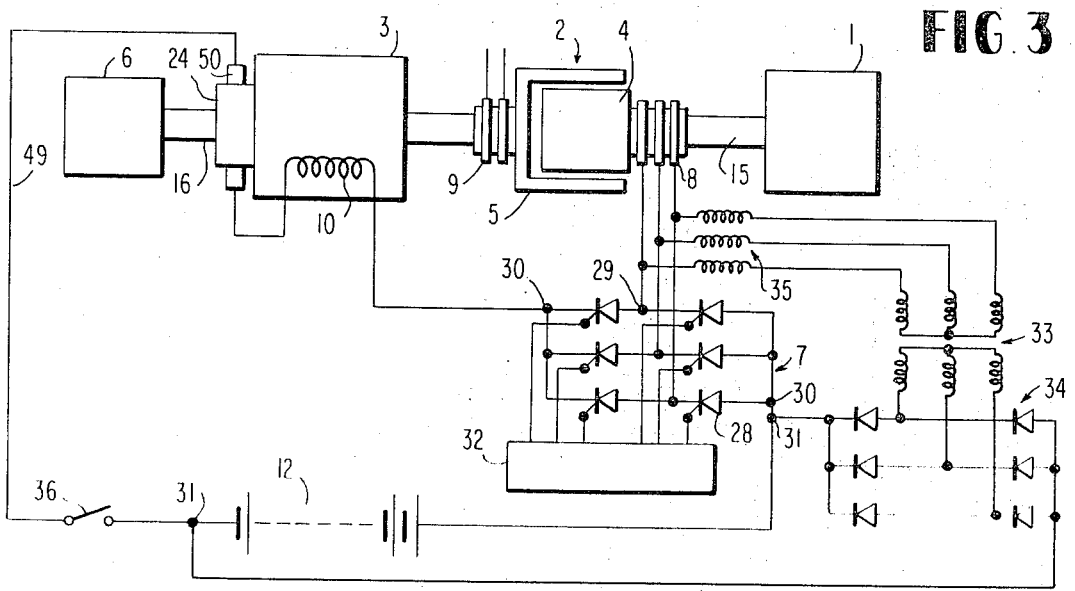

In case of starting of this system, first, the driving machine is driven at a constant speed, the circuit of the electric wiring 49 being opened by a switch 36 which is not shown in FIG. 1 and FIG. 2 but shown in FIG. 3. So long as the circuit of the electric wiring 49 opens, the load 6 is not driven even if the driving machine 1 is driven.

In starting condition of this system, circuit of FIG. 2 is preferable to FIG. 1. For example, if in starting of this system, the driving machine 1 is driven 1,000 rpm, the A.C. voltage of the armature winding of the rotor 4 is controlled at 80 V by controlling the control device 11, and the voltage of the electric battery group is 100 V in FIG. 2, the voltage supplied to the terminals of the direct current commutating machine 3 becomes 80 V × 1.35 − 100 V = 8 V, and the direct current commutating machine 3 can be started smoothly, the battery is charged from the electromagnetic coupling 2. After the load 6 is driven at a slow speed in starting condition, the exciting current of the electromagnetic coupling 2 increases by controlling the control device 11, then the speed of the load 6 is accelerated gradually. After that, the electric battery group 12 is removed from the circuit of FIG. 2. In this case also, the speed of the load 6 can be controlled by controlling either the control device 11 or the control device 43 of the voltage field winding 51 of the D.C. commutating machine 3. The speed of the load 6 is further raised up by connecting the circuit of FIG. 1 in which the load 6 is driven by sum of the powers of the driving machine 1 and of the electric battery group 12.

As can be understood from the explanation described hitherto, the driving machine 1 is always driven while the load 6 is driven, and the direct current commutating machine 3 can be supplied from the driving machine 1, while it is supplied from the electric battery group 12 which is shown in FIG. 1, and also can be supplied from the driving machine 1, while the electric battery group 12 is charged from the driving machine 1, which is shown in FIG. 2.

It can be understood from the above explanation that a special feature of this invention is that the speed of the driving machine or prime mover 1 being kept constant, the speed of the load 6 can be controlled, and the power of the electric battery group can be added to the power of the driving machine or the prime mover 1 when large power driving the load is necessary such as in case of driving the wheel of high speed range of vehicle, and the electric battery group can be charged from the electromagnetic coupling 2 driven by the driving machine or prime mover 1 when the load 6 needs not large power. Thus, the capacity of the driving machine or prime mover can be small.

In FIG. 5, a thyrister chopper 41 is connected electrically in the closed circuit composed of the electric battery group 12, the converter 7 and the armature winding of the electric rotating machine 3. The thyrister chopper 41 is composed of at least one controlled rectifier which can be controlled by the control device 42 connected electrically in the control circuit of the thyrister chopper. The speed of the load 6 in FIG. 5 can be controlled either by controlling the control device 43 of the voltage field winding 51 of the D.C. commutating machine 3, by controlling the control device 11 of exciting current of the electromagnetic coupling 2, or by controlling the control device 42 of the thyristor chopper 41. In FIG. 6, the polarity of the electric battery group 12, electrically connected in series with the D.C. terminals 30 of the converter 7 and the armature winding of the electric rotating machine 3, is so arranged that the electric battery group 12 can be supplied with electric power from the electromagnetic coupling 2 through the converter 7 and the direct current commutating machine 3.

In FIG. 3, the converter 7 is composed of controlled rectifiers which are controlled by a control device 32. The converter 7 in FIG. 3 can also be operated as an inverter. When the direct current commutating machine 3 is controlled in a low speed range, the converter 7 is operated as an inverter. A switch 36 is used to open and close the electric closed circuit. The armature winding of the electromagnetic coupling 2 is connected electrically with the output terminals 31 of the electric battery group 12 through a transformer 33 and another converter 34 composed of recitifiers. The symbol 35 shows a three phase reactor. The electric battery group 12 can be supplied with electric power from the electromagnetic coupling 2 through the reactor 35, the transformer 33 and the converter 34.

In FIG. 4, the electric rotating machine 3 is an alternating current machine having a stator 26, a rotor 27 and an armature winding 21 in which alternating current flows, as shown in FIG. 8. FIG. 8 shows that the mechanical combination between the rotor 5 of the electromagnetic coupling 2 and the rotor 27 of the electric rotating machine 3 is made by an arrangement of a rotor which is provided with material 18 of a magnetic circuit for the electromagnetic coupling 2 in its inner face and is provided with material 19 of a magnetic circuit for the electric rotating machine 3 in its outer face and which rotates in a space between the stator 26 of the electric rotating machine 3 and the other rotor 4 of the electromagnetic coupling 2. FIG. 8 shows also that the surface of the material 17 of the magnetic circuit of the rotor 4 of the electromagnetic coupling 2 and the surface of the material 20 of the magnetic circuit of the alternating current machine 3 exist together in a secion A'B' perpendicular to a shaft of the rotor 4 of the electromagnetic coupling 2. Sliprings 46 are used for supplying an exciting current to the field winding 44 of the alternating current machine 3.

In FIG. 4, an inverter 37 composed of controlled rectifiers 39 is connected electrically in the closed circuit composed of the electric battery group 12, the converter 7 and the armature winding of the electric rotating machine 3. The control device 40 is used for controlling the control circuit of the controlled rectifiers 39. The speed of the load 6 in FIG. 4 can be controlled either by controlling the control device 40 of the inverter 37, by controlling the control device 32 of the rectifiers 28 or by controlling the exciting current of the electromagnetic coupling 2. A switch 38 is used to make the electric closed circuit open and close.

The electric diagrams of FIG. 1, FIG. 2, FIG. 3, FIG. 4, FIG. 5 and FIG. 6 can be used as those of electric vehicles. The load 6 can be thought as a wheel of an electric vehicle, and the driving machine 1 can be a prime mover, when each figure of these electric diagrams is used in an electric vehicle.

Figure 9:
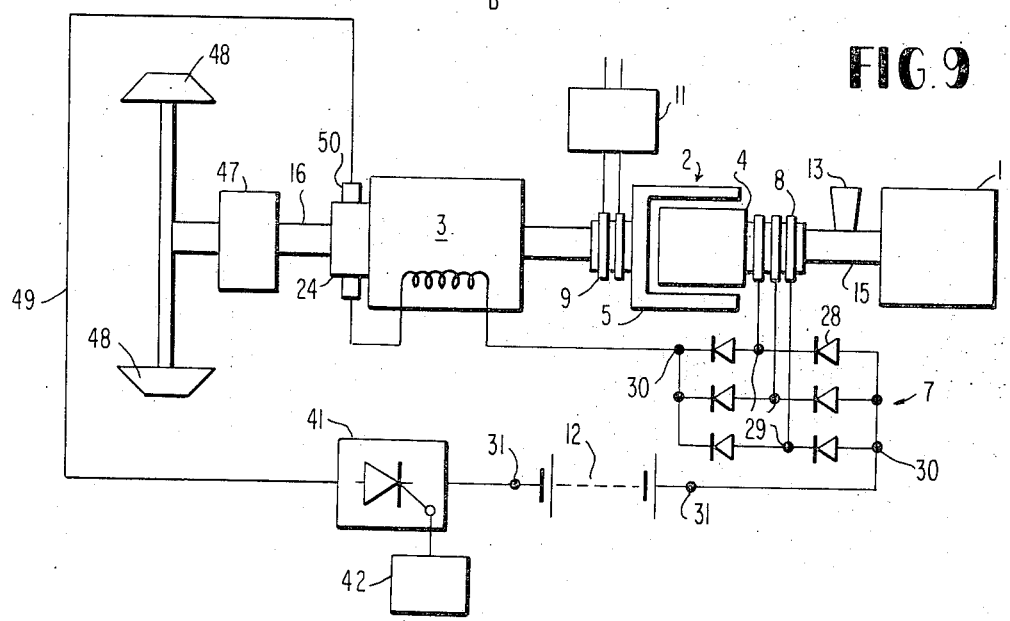

In FIG. 9, wheels 48 of an electric vehicle and a differential gear 47 is shown. The wheels 48 can be driven by the electric rotating machine 3 combined with the electromagnetic coupling 2 through the differential gear 47.

When the driving machine 1 is an electric motor supplied with electric power from the electric battery group (although an electric circuit between the electric battery group 12 and the driving machine 1 is not shown), the load 6 can be driven by only the energy of the electric battery group 12. This case is important when it is used in an electric vehicle.

What is claimed is:

1. An electric control system of an electric machine arrangement comprising:

an electromagnetic coupling having two rotors which rotate with respect to each other, one of which is provided with an armature winding; an electric rotating machine having a stator, a rotor and an armature winding; mechanical connecting means connecting one of said two rotors of the said electromagnetic coupling with said rotor of the said electric rotating machine; a converter composed of rectifiers and having A.C. terminals and D.C. terminals; electric connecting means providing an electric connection between said armature winding of the said electromagnetic coupling and said armature winding of the said electric rotating machine through the said converter; and an electric battery group which has output terminals being arranged to connect electrically in series with the said armature winding of the electric rotating machine and the said D.C. terminals of the converter, so that the electric battery group can supply said electric rotating machine with electric power through the said rectifiers of the converter simultaneously with supply of electric power to the said electric rotating machine from the electromagnetic coupling; wherein said rotor of the electromagnetic coupling combined mechanically with the rotor of the electric rotating machine drives a load, and the other rotor of the electromagnetic coupling being driven by a driving machine.

2. An electric control system of an electric machine arrangement as claimed in claim 1, wherein the electric rotating machine is a direct current commutating machine having a stator provided with poles and a rotor provided with an armature winding and commutators.

3. An electric control system of an electric machine arrangement as claimed in claim 1, wherein the electric rotating machine is an alternating current machine having a stator, a rotor and an armature winding in which alternating current flows.

4. An electric control system of an electric machine arrangement as claimed in claim 1, wherein the polarity of the electric battery group electrically connected in series with the D.C. terminals of the converter and the armature winding of the electric rotating machine is so arranged that the electric battery group can be supplied with electric power from the electromagnetic coupling through the converter and the electric rotating machine.

5. An electric control system of an electric machine arrangement as claimed in claim 1, wherein at least one controlled rectifier other than said converter rectifiers is connected electrically in the closed circuit composed of the electric battery group, the converter and the electric rotating machine.

6. An electric control system of an electric machine arrangement as claimed in claim 1, wherein a thyrister chopper is connected electrically in the closed circuit composed of the electric battery group, the converter and the armature winding of the electric rotating machine.

7. An electric control system of an electric machine arrangement as claimed in claim 1, wherein the converter is composed of controlled rectifiers.

8. An electric control system of an electric machine arrangement as claimed in claim 7, wherein said converter is so arranged that the converter can also be operated as an inverter.

9. An electric control system of an electric machine arrangement as claimed in claim 1, wherein the armature winding of the electromagnetic coupling is connected electrically to the output terminals of the electric battery group through a transformer and another converter composed of rectifiers.

10. An electric control system of an electric machine arrangement as claimed in claim 3, wherein an inverter composed of controlled rectifiers is connected electrically in the closed circuit composed of the electric battery group, the converter and the armature winding of the electric rotating machine.

11. An electric control system of an electric machine arrangement as claimed in claim 1, wherein the electric rotating machine is a direct current commutating machine having a stator provided with poles and a rotor provided with an armature winding and commutators; the converter is composed of controlled rectifiers; and the armature winding of the electromagnetic coupling is connected electrically with the output terminals of the electric battery group through a transformer and another converter composed of additional rectifiers.

12. An electric control system of an electric machine arrangement as claimed in claim 1, wherein the electric rotating machine is an alternating current machine having a stator, a rotor and an armature winding in which alternating current flows; the converter is composed of controlled rectifiers; an inverter composed of controlled rectifiers connected electrically in the closed circuit composed of the electric battery group, the converter and the electric rotating machine; and the armature winding of the electromagnetic coupling is connected electrically with the output terminals of the electric battery group through a transformer and another converter composed of additional rectifiers.

13. An electric control system of an electric machine arrangement as claimed in claim 1, wherein a rotor is used in common as one of the two rotors of the electromagnetic coupling and as the rotor of the electric rotating machine, in order to combine mechanically the said one of the two rotors of the electromagnetic coupling with the rotor of the electric rotating machine.

14. An electric control system of an electric machine arrangement as claimed in claim 2, wherein a rotor is used in common as one of the two rotors of the electromagnetic coupling and as the rotor of the direct current commutating machine by an arrangement in which the inner face of the rotor is provided with material of a magnetic circuit for the electromagnetic coupling and the outer face of the rotor is provided with material of a magnetic circuit for the direct current commutating machine, and the said rotor of the electromagnetic coupling rotates in a space between the stator of the direct current commutating machine and the other rotor of the electromagnetic coupling.

15. An electric control system of an electric machine arrangement as claimed in claim 3, wherein the mechanical combination between the rotor of the electromagnetic coupling and the rotor of the electric rotating machine is made by an arrangement of a rotor which is provided with material of a magnetic circuit for the electromagnetic coupling in its inner face and is provided with material of a magnetic circuit for the electric rotating machine in its outer face and which rotates in a space between the stator of the electric rotating machine and the other rotor of the electromagnetic coupling.

16. An electric control system of an electric machine arrangement as claimed in claim 1, wherein the driving machine is a prime mover, and the load is a wheel of an electric vehicle.

17. An electric control system of an electric machine arrangement as claimed in claim 1, wherein the driving machine is a prime mover, and the rotor of the electric rotating machine drives wheels of an electric vehicle through a differential gear.

18. An electric control system of an electric machine arrangement as claimed in claim 1, wherein the driving machine is an electric motor, and the load is a wheel of an electric vehicle.

* * * * *